(12) United States Patent
Zhang et al.

(10) Patent No.: US 12,019,327 B1
(45) Date of Patent: Jun. 25, 2024

(54) DISPLAY MODULES AND DISPLAY DEVICES

(71) Applicant: Shenzhen China Star Optoelectronics Semiconductor Display Technology Co., Ltd., Guangdong (CN)

(72) Inventors: Haofeng Zhang, Guangdong (CN); Haibing Shao, Guangdong (CN); Tian Ou, Guangdong (CN); Song Fang, Guangdong (CN); Jing Zhang, Guangdong (CN); Jiangbo Yao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/478,995

(22) Filed: Sep. 30, 2023

(30) Foreign Application Priority Data

May 18, 2023 (CN) .......................... 202310561944.5

(51) Int. Cl.
*G02F 1/1335* (2006.01)

(52) U.S. Cl.
CPC .. *G02F 1/133526* (2013.01); *G02F 1/133562* (2021.01); *G02F 2201/52* (2013.01)

(58) Field of Classification Search
None
See application file for complete search history.

(56) References Cited

U.S. PATENT DOCUMENTS

2022/0163843 A1* 5/2022 Li .................... G02F 1/133514

* cited by examiner

*Primary Examiner* — Phu Vu
(74) *Attorney, Agent, or Firm* — PV IP PC; Zhigang Ma; Wei Te Chung

(57) ABSTRACT

Display modules and display devices are provided. The display module includes a display panel and a lens layer disposed on a light-emitting side of the display panel. The display panel includes a plurality of visual pixel groups, and the lens layer includes a plurality of cylindrical lenses each covering one of the visual pixel groups. The cylindrical lens extends along a first direction and has a first virtual centerline parallel to the first direction and dividing the cylindrical lens into a first area and a second area. The visual pixel group includes at least one first subgroup corresponding to the first area and at least one second subgroup corresponding to the second area. In a top view direction of the display module, the first subgroup and the second subgroup are partially overlapped or not overlapped in a second direction perpendicular to the first direction.

20 Claims, 14 Drawing Sheets

DISPLAY MODULES AND DISPLAY DEVICES

CROSS-REFERENCE TO RELATED APPLICATION

This application claims priority to Chinese Patent Application No. 202310561944.5, filed on May 18, 2023, the disclosure of which is incorporated herein by reference in its entirety.

TECHNICAL FIELD

The present disclosure relates to the field of display technologies, and in particular, to display modules and display devices.

BACKGROUND

In recent years, naked-eye stereoscopic images have been favored by more and more consumers. The naked-eye stereoscopic images are images with 3D (Three Dimensions) effects without using 3D glasses. When a stereoscopic image display module displays 3D stereoscopic images, limited pixels of a screen are split into different directions, and a visual pixel resolution is reduced after the pixels are fused with binocular vision, thus a perception effect is reduced.

Therefore, there is an urgent need for display modules and display devices to solve the above technical problems.

SUMMARY

In view of above, display modules are provided according to embodiments of the present disclosure. The display module includes a display panel and a lens layer disposed on a light-emitting side of the display panel; the display panel includes a plurality of visual pixel groups, and the lens layer includes a plurality of cylindrical lenses each covering one of the visual pixel groups; the cylindrical lens extends along a first direction and has a first virtual centerline parallel to the first direction and dividing the cylindrical lens into a first area and a second area; the visual pixel group includes at least one first subgroup corresponding to the first area and at least one second subgroup corresponding to the second area; and in a top view direction of the display module, the first subgroup and the second subgroup are partially overlapped or not overlapped in a second direction perpendicular to the first direction.

Display devices are further provided according to embodiments of the present disclosure. The display device includes the above-mentioned display module and a device body, and the device body is combined with the display module as one.

DETAILED DESCRIPTION

Figure 1:
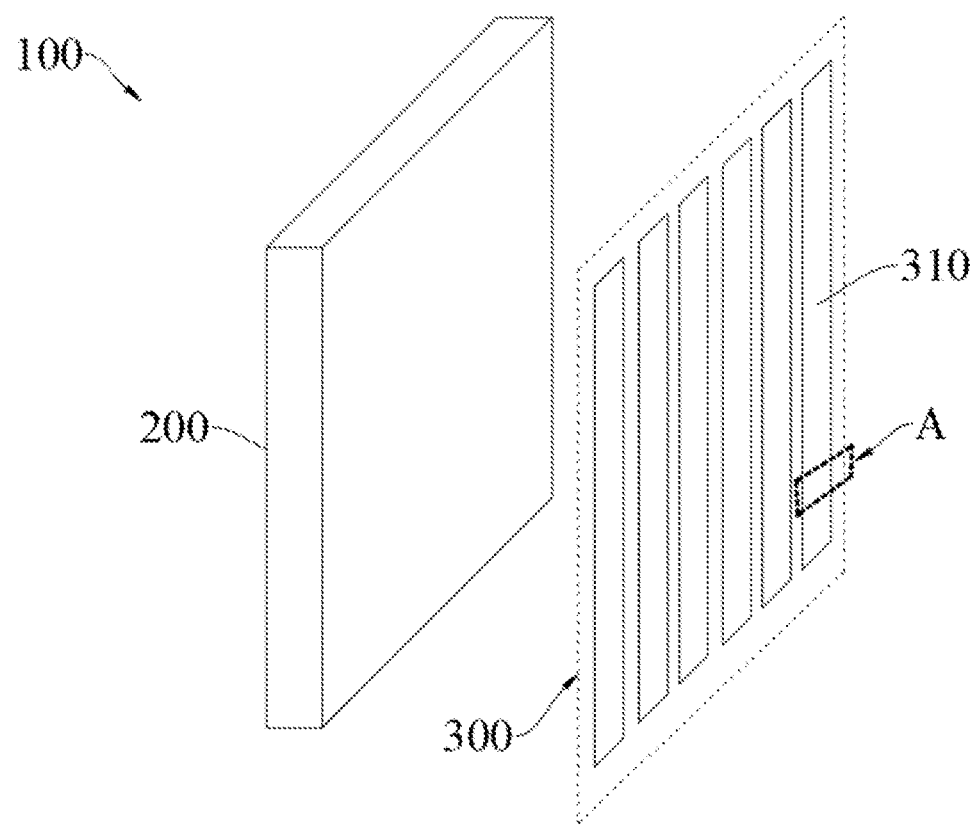
FIG. 1 is a structural schematic view of a display module according to an embodiment of the present disclosure.

Technical solutions in the embodiments of the present disclosure will be clearly and completely described below with reference to the accompanying drawings. Obviously, the described embodiments are only some of the embodiments of the present disclosure, not all of them. Based on the embodiments in the present disclosure, all other embodiments obtained by those skilled in the art without making creative efforts belong to the scope of protection of this application. In addition, it should be understood that the specific implementations described here are only used to illustrate and explain the present disclosure, and are not intended to limit the present disclosure. In the present disclosure, unless stated to the contrary, the orientation terms such as "up" and "down" generally refer to up and down in an actual use or working state of the devices, and the terms "inside" and "outside" refer to an outline of an installation.

Referring to FIG. 1 to FIG. 14, display modules 100 are provided according to embodiments of the present disclosure. The display module 100 includes:

- a display panel 200 including a plurality of visual pixel groups 400; and
- a lens layer 300 disposed on a light-emitting side of the display panel 200 and including a plurality of cylindrical lenses 310 each covering one of the visual pixel groups 400.

Each of the cylindrical lenses 310 extends along a first direction and has a first virtual centerline 301 parallel to the first direction. The first virtual centerline 301 divides the cylindrical lens 310 into a first area 311 and a second area 312.

Each of the visual pixel groups 400 includes at least one first subgroup 410 corresponding to the first area 311 and at least one second subgroup 420 corresponding to the second area 312. In a top view direction of the display module 100, the first subgroup 410 and the second subgroup 420 are partially overlapped (i.e. do not completely overlap) in a second direction perpendicular to the first direction, or the first subgroup 410 and the second subgroup 420 are not overlapped in the second direction.

In present disclosure, the first subgroup and the second subgroup corresponding to the left and right viewpoints are arranged to not completely overlap in a direction perpendicular to the first virtual centerline of the cylindrical lens, so that subpixels in the first subgroup and the second subgroup will not completely overlap after projected by the cylindrical lens, so as to maintain an original resolution of the subpixels. After the human eyes receive the information, the resolution can be restored through visual fusion. Therefore, it can reduce the loss of display resolution while realizing naked-eye 3D, and it can also reduce the loss of display resolution when displaying images, thereby improving the perception effect.

The technical solutions of the present disclosure will now be described in conjunction with specific embodiments.

In the embodiments, referring to FIG. 1, FIG. 2, FIG. 3, and FIG. 4, the display module 100 includes a display panel 200 including a plurality of visual pixel groups 400 and a lens layer 300 disposed on a light-emitting side of the display panel 200. The lens layer 300 includes a plurality of cylindrical lenses 310 each covering one of the visual pixel groups 400. The cylindrical lens 310 extends along a first direction and has a first virtual centerline 301 parallel to the first direction. The first virtual centerline 301 divides the cylindrical lens 310 into a first area 311 and a second area 312. The visual pixel group 400 includes at least one first subgroup 410 corresponding to the first area 311 and at least one second subgroup 420 corresponding to the second area 312. In a top view direction of the display module 100, the first subgroup 410 and the second subgroup 420 corresponding to a same cylindrical lens 310 are partially overlapped or not overlapped in a second direction perpendicular to the first direction.

For convenience of description, in FIG. 2 to FIG. 13, the first direction is parallel to a Y-axis direction, and the second direction is parallel to an X-axis direction. The first subgroup 410 is arranged corresponding to the first area 311, and the second subgroup 420 is arranged corresponding to the second area 312. For naked-eye 3D display, the visual pixel group 400 may one group or multi-group of pixels corresponding to the left and right eyes of the observer, which include pixels for the left eye and pixels for the right eye. For example, the first subgroup may correspond to a pixel projected into the right eye, and the second subgroup may correspond to a pixel projected into the left eye. The visual pixel group may include one first subgroup and one second subgroup, and may also include multiple first subgroups and multiple second subgroups. A number of the first subgroups and a number of the second subgroups in one visual pixel group can be adjusted according to a size or resolution requirements of the cylindrical lens, which is just an example here and not specifically limited.

Each of the first subgroup 410 and the second subgroup 420 may include at least three subpixels 500 those emit light with different colors.

In FIG. 1, an area A is a partial area where a cylindrical lens 310 is selected.

Figure 2:
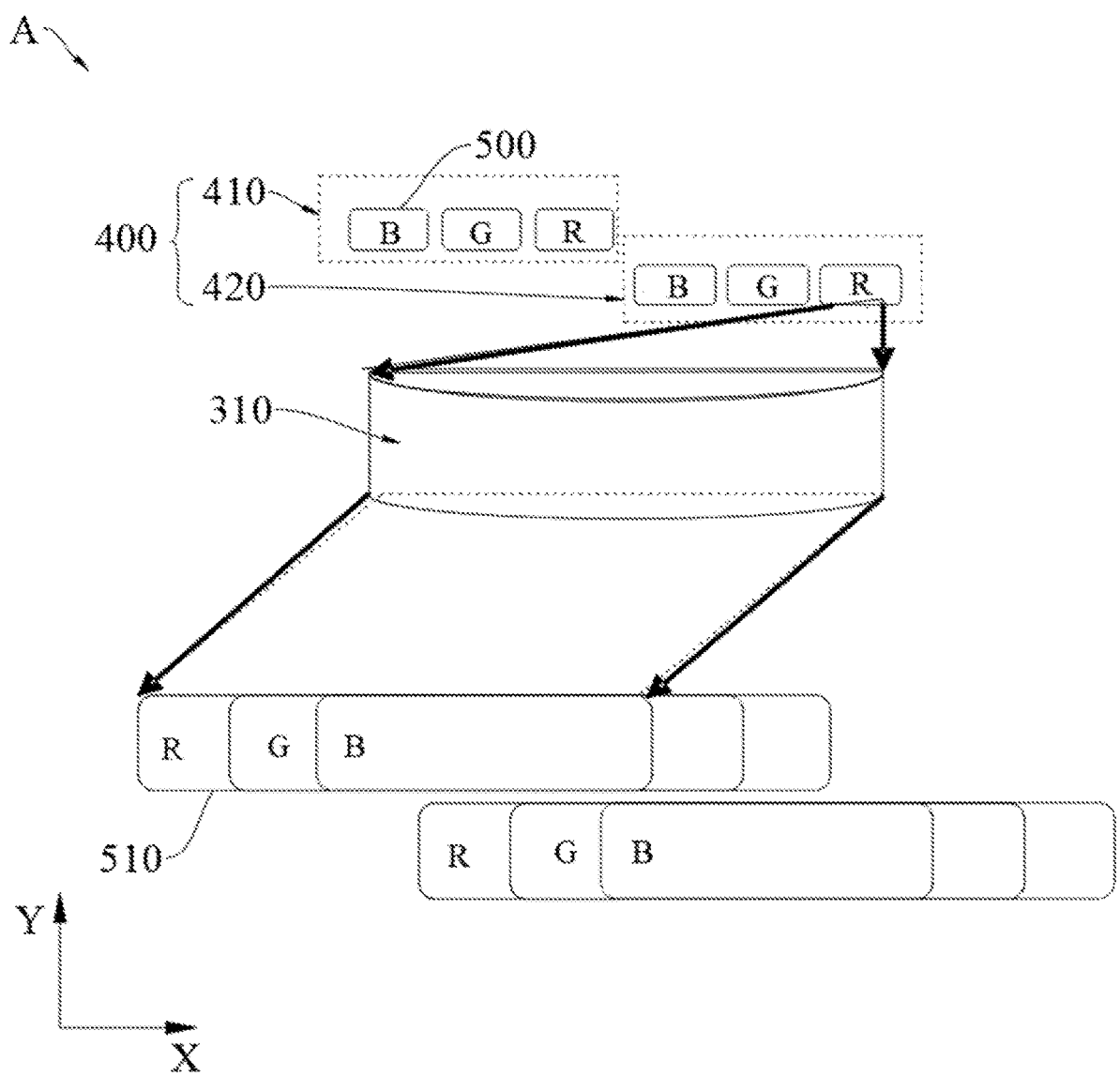
FIG. 2 is a first enlarged schematic view of an area A in FIG. 1.

In FIG. 2, the first subgroup 410 and the second subgroup 420 are not overlapped in the second direction, the three subpixels in the first subgroup 410 are overlapped in the second direction, and the three subpixels in the second subgroup 420 are overlapped in the second direction.

Figure 3:
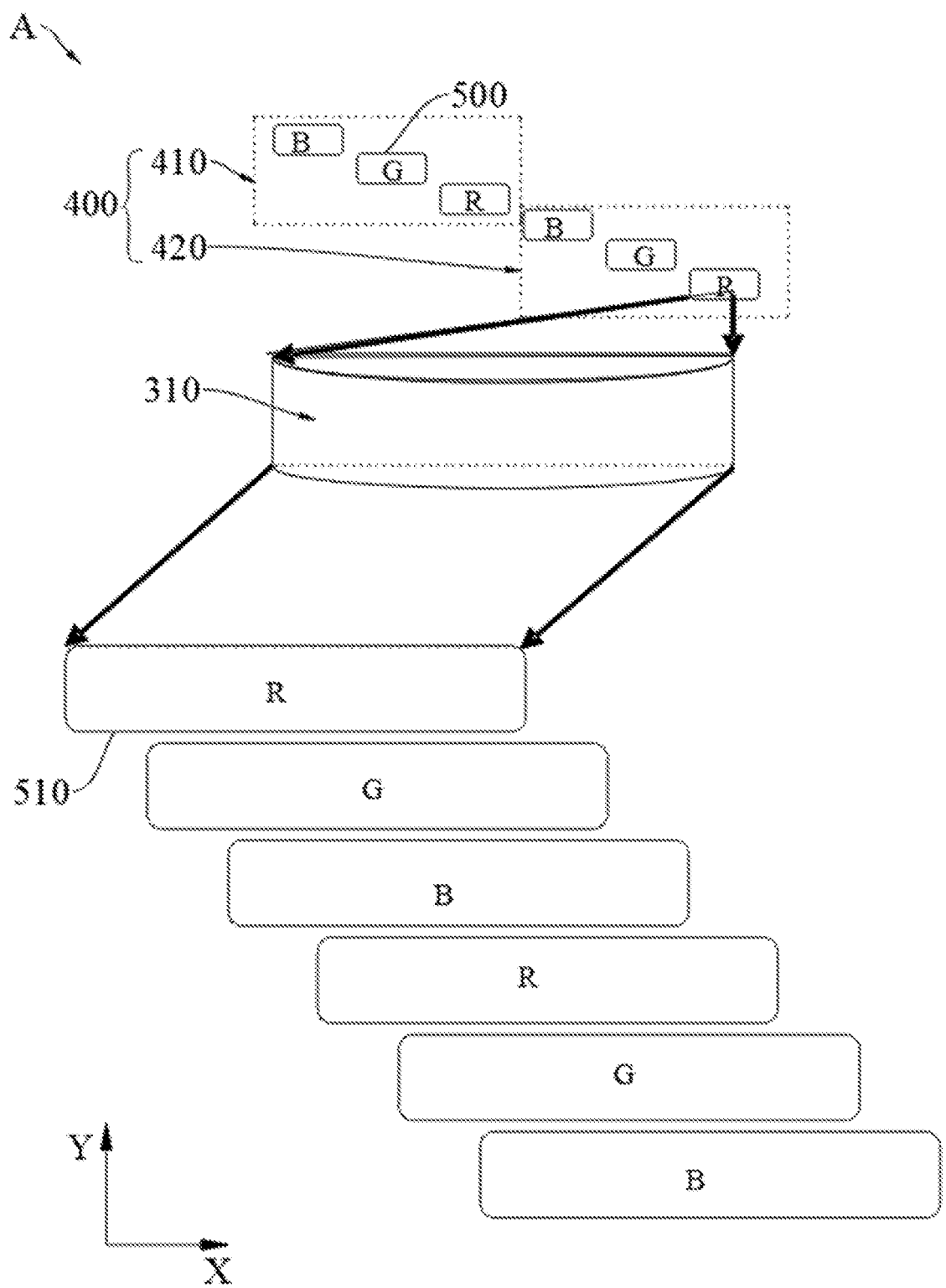
FIG. 3 is a second enlarged schematic view of an area A in FIG. 1.

In FIG. 3, the first subgroup 410 and the second subgroup 420 are not overlapped in the second direction, the three subpixels in the first subgroup 410 are not overlapped in the second direction, and the three subpixels in the second subgroup 420 are not overlapped in the second direction.

Specifically, referring to FIG. 2, the three subpixels in the first subgroup 410 are overlapped in the second direction, and the three subpixels in the second subgroup 420 are overlapped in the second direction. Virtual images of the subpixels in the first subgroup 410 are overlapped after projected by the cylindrical lens 310, and virtual images of the subpixels in the second subgroup 420 are overlapped after projected by the cylindrical lens 310. The first subgroup 410 and the second subgroup 420 can correspond to two viewpoints. For example, the light of the first subgroup 410 enters the right eye after projected by the cylindrical lens 310, and the light of the second subgroup 420 enters the left eye after projected by the cylindrical lens 310; the first area 311 corresponds to the right eye, and the second area 312 corresponds to the left eye. The first subgroup 410 and the second subgroup 420 are misaligned in the first direction, and the first subgroup 410 and the second subgroup 420 will be enlarged after projected by the cylindrical lens 310, so the first subgroup 410 and the second subgroup 420 actually viewed are not overlapped in the first direction. Thus, the light information actually received by the human eyes is two light information of the first subgroup 410 and the second subgroup 410 those are clear and independent, but due to a dense arrangement of pixels, the human eyes will automatically fuse the left and right light information after receiving it, but the pixel resolution is still an original resolution of the first subgroup 410 and the second subgroup 420. That is, after the pixel is enlarged in the second direction, the color information is projected into the human eyes completely, so a pixel density remains unchanged. Thus, the loss of display resolution is reduced while realizing naked-eye 3D. When displaying a planar image, after the first subgroup and the second subgroup are endowed with the color information of the planar display, the color information of the pixels can be completely projected into the human eyes, thereby realizing a high-resolution display, reducing the loss of the display resolution, and improving the perception effect.

Specifically, referring to FIG. 3, the three subpixels in the first subgroup 410 are not overlapped in the second direction, and the three subpixels in the second subgroup 420 are not overlapped in the second direction, so virtual images of the subpixels in the first subgroup 410 are not overlapped after projected by the cylindrical lens 310, and virtual images of the subpixels in the second subgroup 420 are not overlapped after projected by the cylindrical lens 310. The first subgroup 410 and the second subgroup 420 can correspond to six viewpoints. compared with the two viewpoints in FIG. 2, multi-viewpoints can further increase a viewing angle of naked-eye 3D and improve the perception effect.

Figure 4:
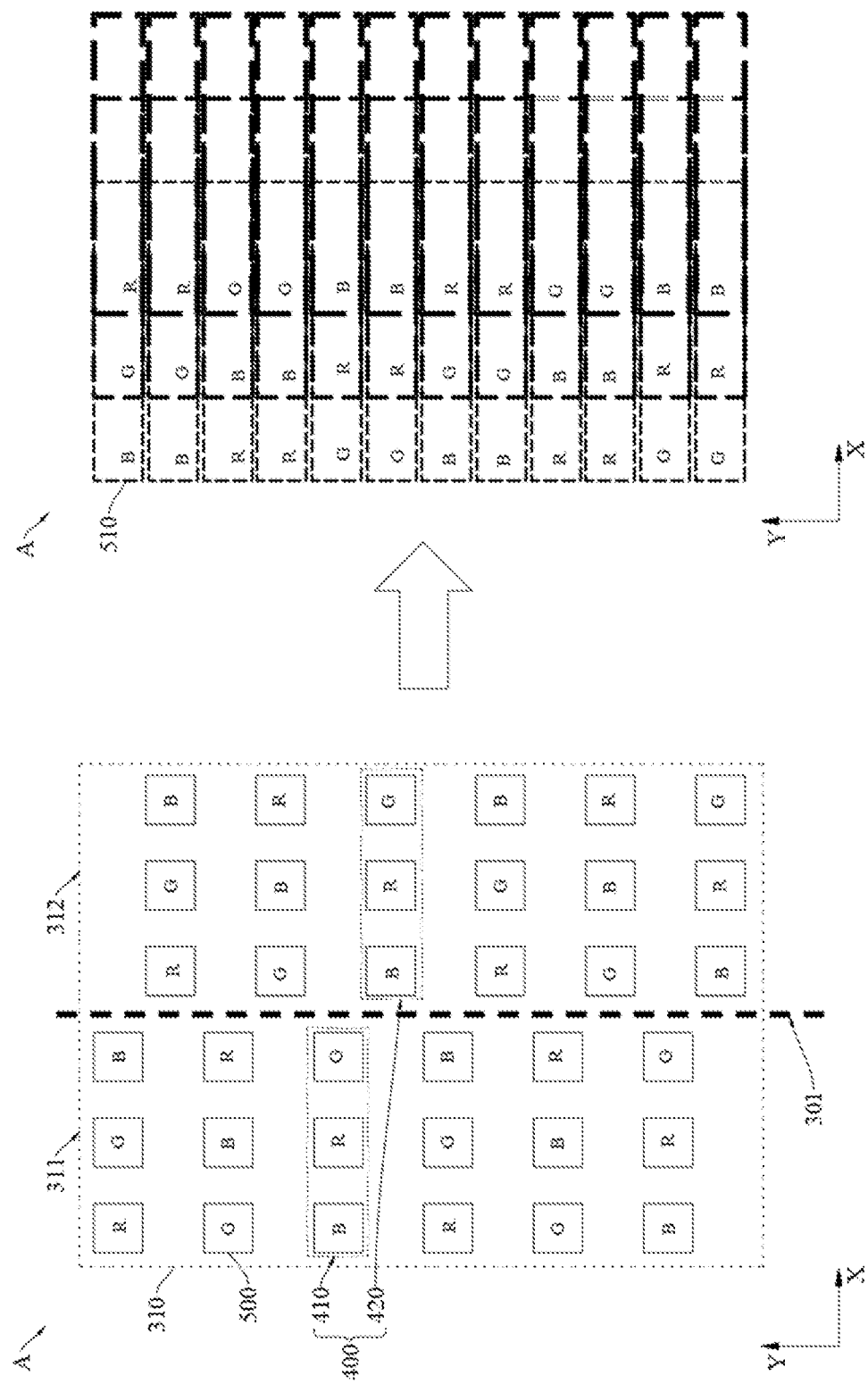
FIG. 4 is a third enlarged schematic view of an area A in FIG. 1.

In some embodiments, referring to FIG. 2, FIG. 3, and FIG. 4, in the top view direction of the display module 100, the first subgroup 410 and the second subgroup 420 are not overlapped at all in the second direction.

For example, the first subgroup 410 and the second subgroup 420 corresponding to a same cylindrical lens 310 are misaligned in the first direction, and there is no overlapping area at all therebetween, which can further enlarge the independent display information, thereby improving the display effect. It can also reduce the loss of display resolution when displaying naked-eye 3D stereoscopic images and planar images, thereby improving the perception effect.

In some embodiments, referring to FIG. 2, FIG. 3, and FIG. 4, the first subgroup 410 and the second subgroup 420 respectively include at least three subpixel 500 that emit light with different colors.

Specifically, the first subgroup 410 may include a red subpixel, a green subpixel, and a blue subpixel; and the second subgroup 420 may include a red subpixel, a green subpixel, and a blue subpixel. The red subpixel, the green subpixel, and the blue subpixel are denoted by R, G, B respectively. The three subpixels 500 constitute a main pixel, which can be mixed into white light. The virtual image of the subpixel refracted by the cylindrical lens 310 is denoted by the label "510". Thus, a complete pixel point information is projected into the human eyes, thereby providing chromaticity information and position information.

Specifically, referring to FIG. 3, the three subpixels in the first subgroup 410 are not overlapped in the second direction, and the three subpixels in the second subgroup 420 are not overlapped in the second direction, so virtual images of the subpixels in the first subgroup 410 are not overlapped after projected by the cylindrical lens 310, and virtual images of the subpixels in the second subgroup 420 are not overlapped after projected by the cylindrical lens 310. The first subgroup 410 and the second subgroup 420 can correspond to six viewpoints. Compared with the two viewpoints in FIG. 2, multi-viewpoints can further increase a viewing angle of naked-eye 3D, reduce an overlapping area of the enlarged subpixels 500, enlarge light information, increase the resolution, and improve the perception effect.

Specifically, the first subgroup 410 may include a red subpixel, a green subpixel, a blue subpixel, and a white subpixel, and the second subgroup 420 may include a red subpixel, a green subpixel, a blue subpixel, and a white subpixel. The white subpixel may only provide a difference in brightness without changing the chromaticity of the first subgroup or the second subgroup. An arrangement of the white subpixel can refer to an arrangement of the above-mentioned red subpixel, green subpixel, and blue subpixel, which will not be repeated here.

In some embodiments, an arrangement order of the subpixels 500 in the first subgroup 410 and the second subgroup 420 is not specifically limited, and the order in the figures is only an example.

Figure 5:
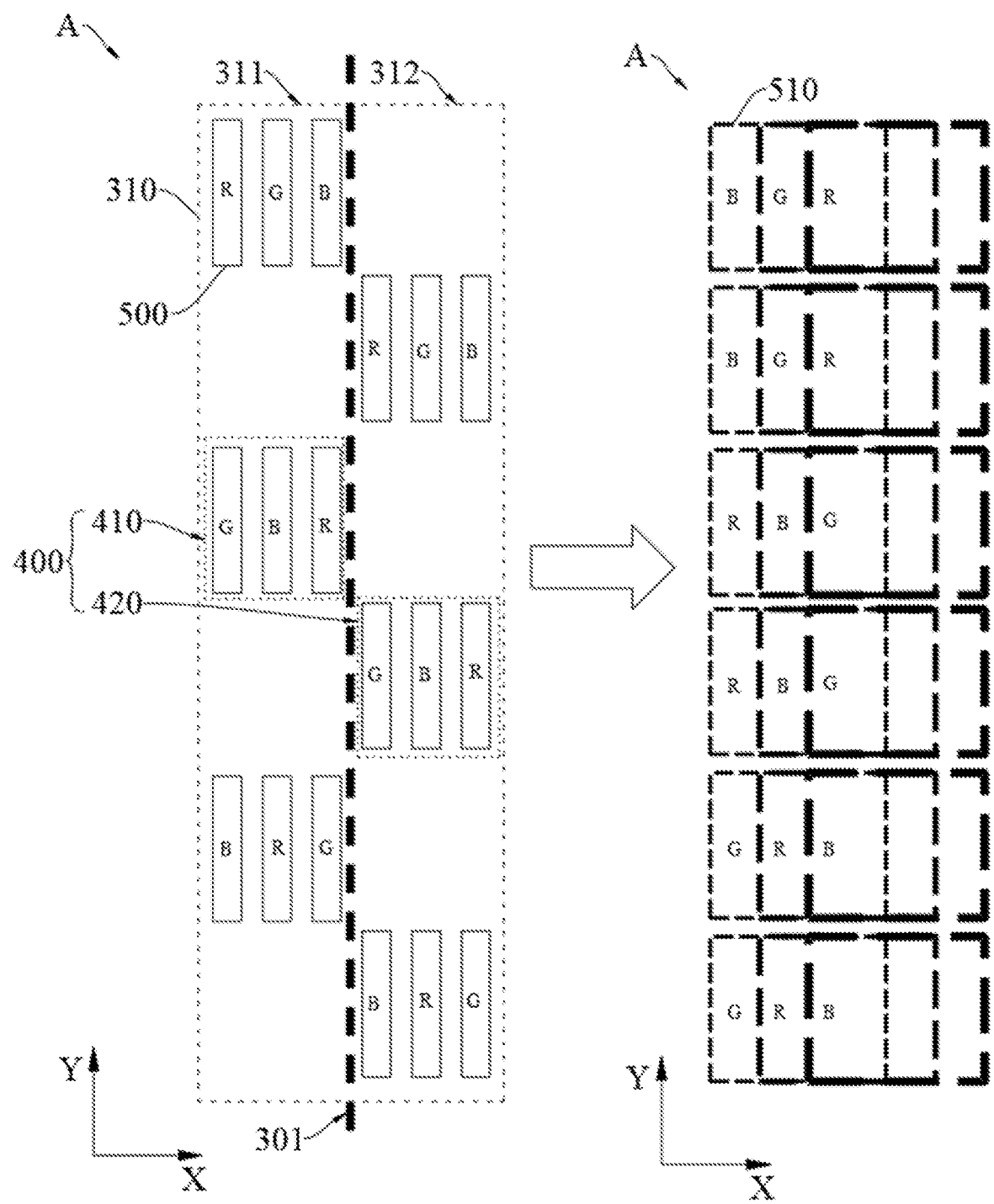
FIG. 5 is a fourth enlarged schematic view of an area A in FIG. 1.
Figure 6:
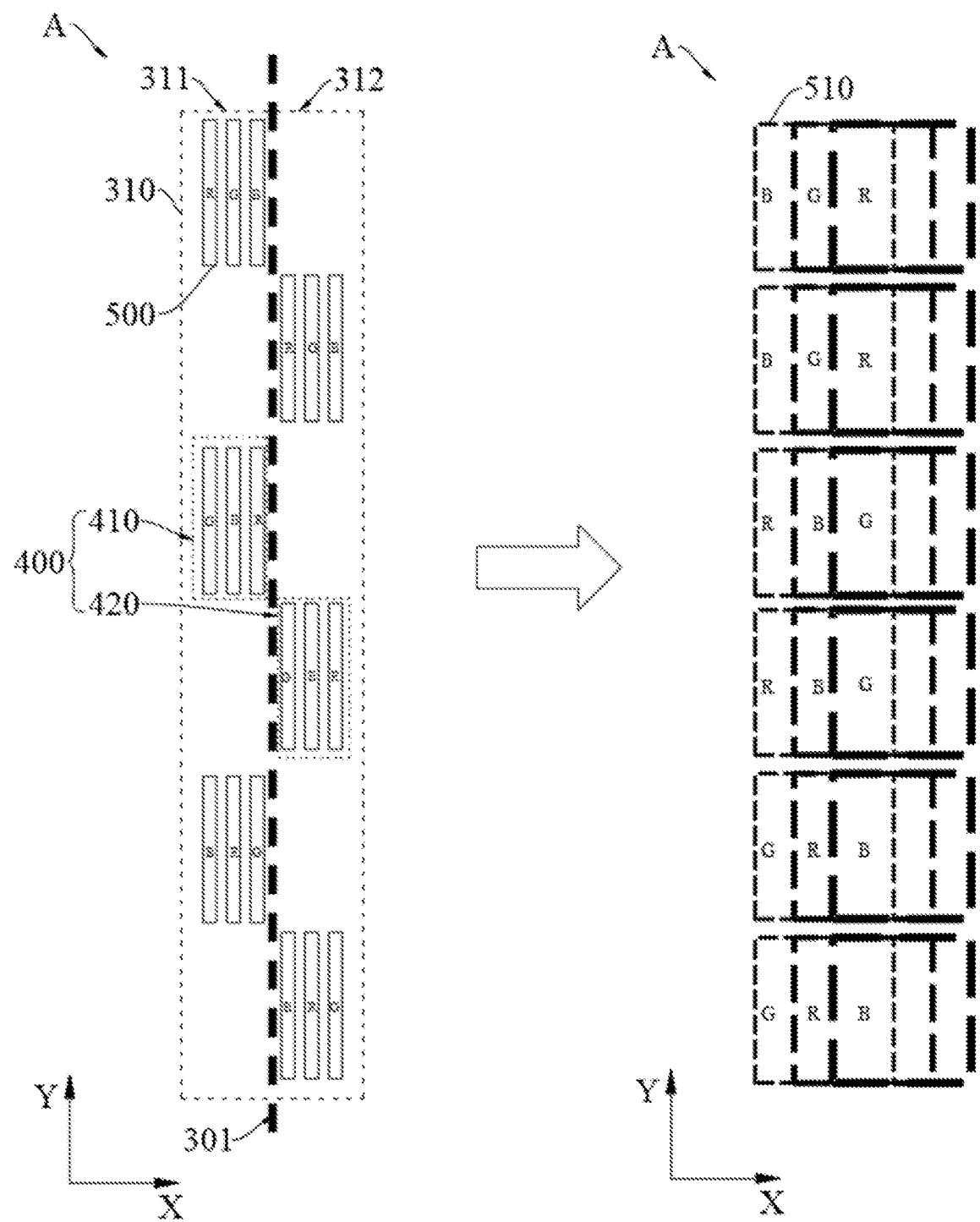
FIG. 6 is a fifth enlarged schematic view of an area A in FIG. 1.

In FIG. 4, the virtual image 510 of each subpixel 500 is a rectangle after magnified by the cylindrical lens 310. In FIG. 5, the virtual image 510 of each subpixel 500 is a rectangle after magnified by the cylindrical lens 310, but tends to be more square in the shape compared with that in FIG. 4. In FIG. 6, he virtual image 510 of each subpixel 500 is a square after magnified by the cylindrical lens 310.

In some embodiments, referring to FIG. 4, FIG. 5, and FIG. 6, in the top view direction of the display module 100, the subpixels 500 in a same first subgroup 410 are arranged along the second direction, and the subpixels 500 in a same second subgroup 420 are arranged along the second direction.

After the subpixels 500 in the first subgroup 410 and the second subgroup 420 projected by the cylindrical lens 310, each subpixel is stretched in the second direction. In order to prevent the first subgroup 410 and the second subgroup 420 from being completely overlapped in the first direction after projected by the lens, the first subgroup 410 and the second subgroup 420 are misaligned in the first direction. At the same time, the subpixels 500 in the first subgroup 410 and the subpixels 500 in the second subgroup 420 are arranged in the second direction, thus it can make full use of the space in the second direction, thereby improving the space utilization rate.

In FIG. 4, FIG. 5, and FIG. 6, after magnified by the cylindrical lens 310, a shape of the virtual image 510 of each subpixel 500 tends to be more square. The human eyes have a better visual acceptance of square pixels, which is conducive to the pixel fusion of 3D stereoscopic images.

Figure 7:
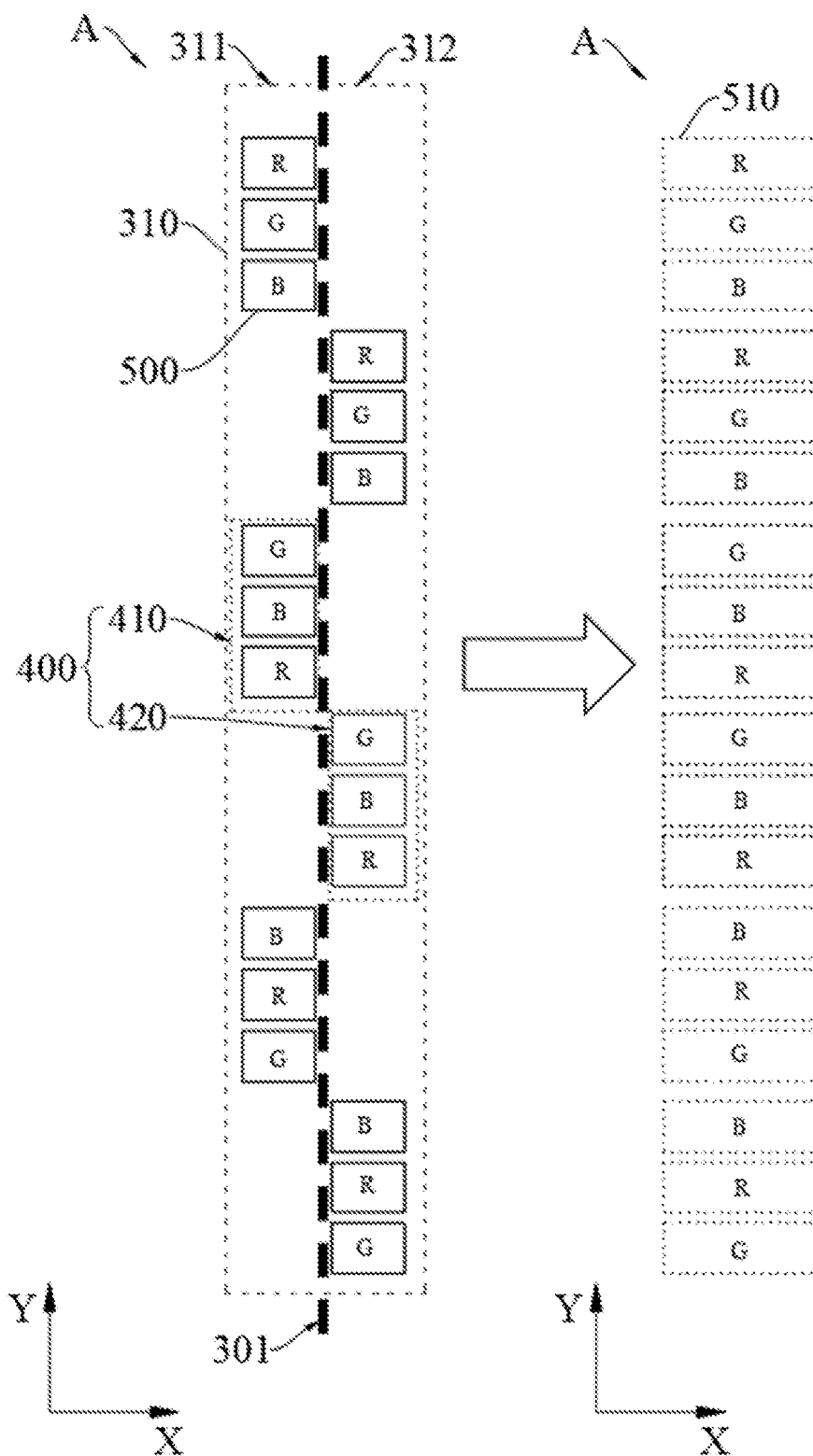
FIG. 7 is a sixth enlarged schematic view of an area A in FIG. 1.
Figure 8:
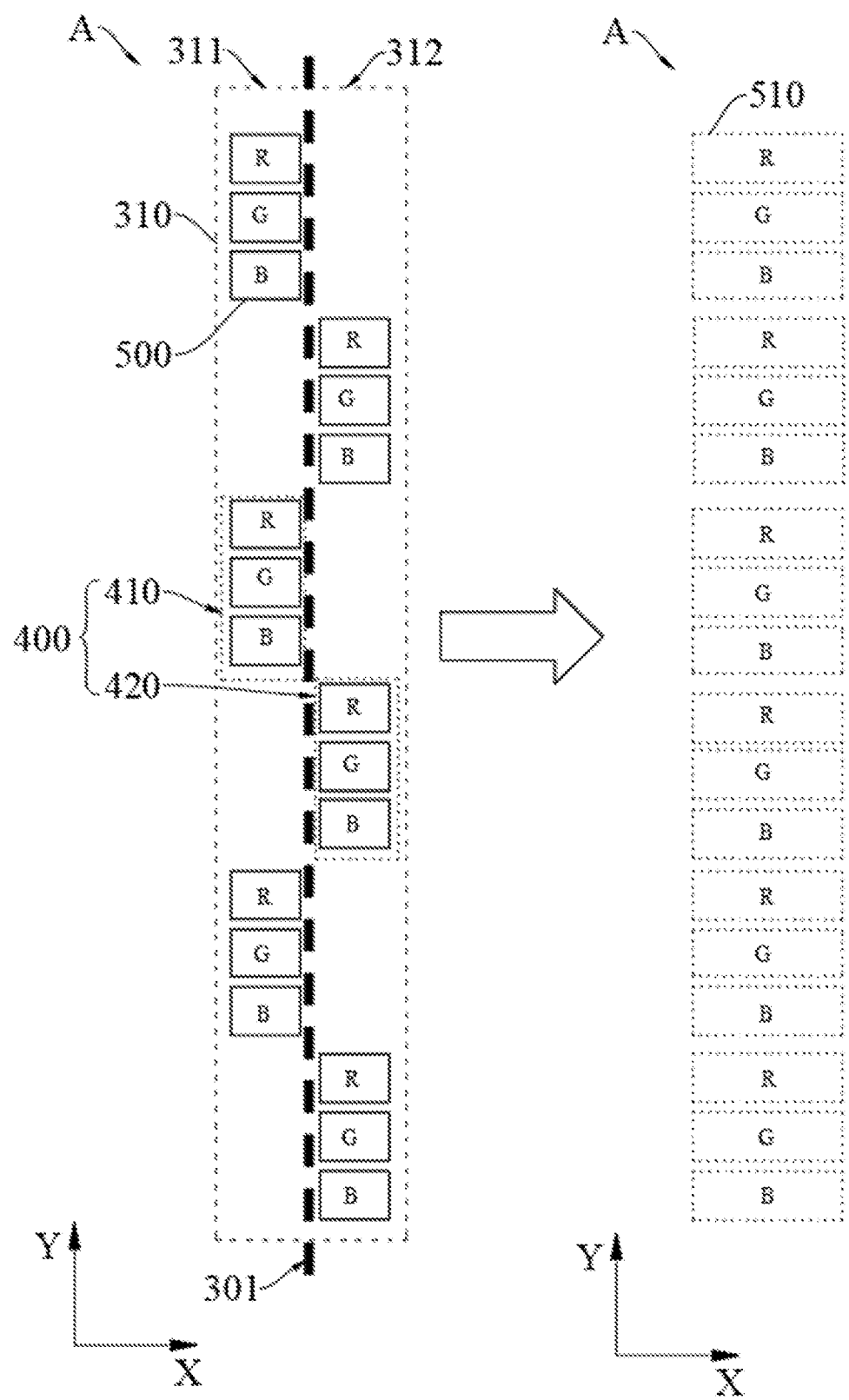
FIG. 8 is a seventh enlarged schematic view of an area A in FIG. 1.

Compared with the structures in FIG. 4, FIG. 5, and FIG. 6, structures in FIG. 7 and FIG. 8 mainly differ in an arrangement direction of the subpixels in the first subgroup and an arrangement direction of the subpixels in the second subgroup. In FIG. 7 and FIG. 8, the subpixels 500 in a same first subgroup 410 are arranged along the first direction, and the subpixels 500 in a same second subgroup 420 are arranged along the first direction.

In FIG. 7, along the first direction, the subpixels in two adjacent first subgroup are arranged in different order, and the subpixels in two adjacent second subgroup are arranged in different order. In FIG. 8, along the first direction, the subpixels in two adjacent first subgroup are arranged in a same order, and the subpixels in two adjacent second subgroup are arranged in a same order. As mentioned above, the arrangement orders of the subpixels in FIG. 7 and FIG. 8 are different, which are used as examples here, and may not be specifically limited.

In some embodiments, referring to FIG. 7 and FIG. 8, in the top view direction of the display module 100, the subpixels 500 in the same first subgroup 410 are arranged along the first direction, and the subpixels 500 in the same second subgroup 420 are arranged along the first direction.

When the subpixels 500 in the same first subgroup 410 are arranged along the second direction, and the subpixels 500 in the same second subgroup 420 are arranged along the second direction, relative positions of R, G, and B arranged along the second direction may be slightly misaligned after magnified by the cylindrical lens, the magnified virtual image has a long length in the first direction, and it is easy to display some colors with colored edges, such as the colored edges in the first direction. At the same time, the R, G, and B arranged in the second direction will be made into thin strips in order to avoid occupying too much space in the second direction, and the process is difficult.

Relatively, when the R, G, B are arranged along the first direction, the subpixels are magnified by the cylindrical lens, a length of the magnified virtual image in the first direction can be appropriately shortened, which is conducive to reducing abnormality of colored edges and improving the display effect. At the same time, contours of the subpixels of R, G, and B arranged in the first direction can tend to be square, which reduces the difficulty of the process.

In some embodiments, referring to FIG. 7 and FIG. 8, in the top view direction of the display module, the subpixels 500 in the same first subgroup 410 are not overlapped in the second direction, and the subpixels 500 in the same second subgroup 420 are not overlapped in the second direction.

The subpixels 500 in the first subgroup 410 and the second subgroup 420 are misaligned in first direction, and there is no overlapping area at all, which can further enlarge the independent display information, thereby improving the display effect. It can also reduce the loss of display resolution when displaying naked-eye 3D stereoscopic images and planar images, thereby improving the perception effect.

In some embodiments, referring to FIG. 6, FIG. 7, and FIG. 8, the visual pixel group 400 is correspondingly arranged on a focal plane of the cylindrical lens 310. By adjusting a focal length of the cylindrical lens and a distance between the display panel and the cylindrical lens, the visual pixel group 400 can be correspondingly arranged on the focal plane of the cylindrical lens 310. The first subgroup 410 has a length in the first direction equal to a width of the cylindrical lens 310 in the second direction, and the second subgroup 420 has a length in the first direction equal to the width of the cylindrical lens 310 in the second direction.

Since the visual pixel group 400 is correspondingly arranged on the focal plane of the cylindrical lens 310, so that after the subpixel 500 is projected by the cylindrical lens 310, a width of the subpixel 500 in the second direction will be magnified to be same with the width of the cylindrical lens 310 in the second direction, the outgoing light is parallel light with the same width as the cylindrical lens 310 in the second direction, and the length of the subpixel 500 in the first direction remains unchanged. Thus, the first subgroup 410 and the second subgroup 420 are designed to have the length in the first direction equal to the width of the cylindrical lens 310 in the second direction. The first subgroup 410 and the second subgroup 420 will form the main pixels that tend to be square after projected by the cylindrical lens 310. The human eyes have a better visual acceptance of square main pixels, which is conducive to the pixel fusion of 3D stereoscopic images, and it has a more delicate and symmetrical planar image effect while ensuring the same pixel density.

In some embodiments, in the top view direction of the display module, the subpixels 500 in the first subgroup 410 are arranged adjacent along the first direction, and the subpixels 500 in the second subgroup 420 are arranged adjacent along the first direction. A ratio of the length of each subpixel 500 in the first subgroup 410 in the first direction to the width of the cylindrical lens 310 in the second direction is 1/3, and a ratio of the length of each subpixel 500 in the second subgroup 420 in the first direction to the width of the cylindrical lens 310 in the second direction is 1/3.

Due to the manufacturing process, there are anti-crosstalk components between adjacent subpixels 500, the above ratio may be 1/3±1/12, and the subpixels 500 in the first subgroup 410 and the second subgroup 420 will form the main pixels that tend to be square after projected by the cylindrical lens 310. The human eyes have a better visual acceptance of square main pixels, which is conducive to the pixel fusion of 3D stereoscopic images, and it has a more delicate and symmetrical planar image effect while ensuring the same pixel density.

Figure 9:
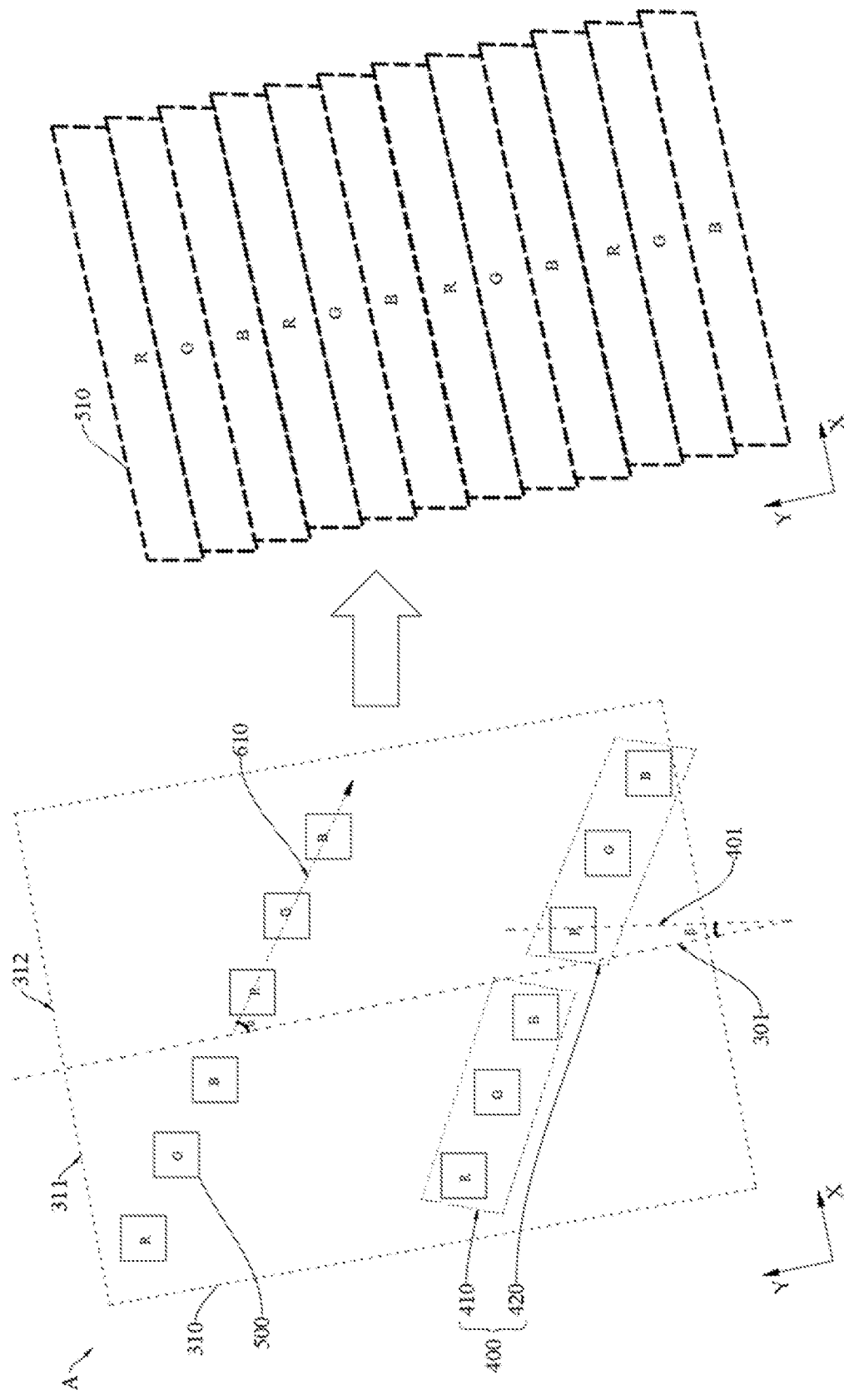
FIG. 9 is an eighth enlarged schematic view of an area A in FIG. 1.
Figure 10:
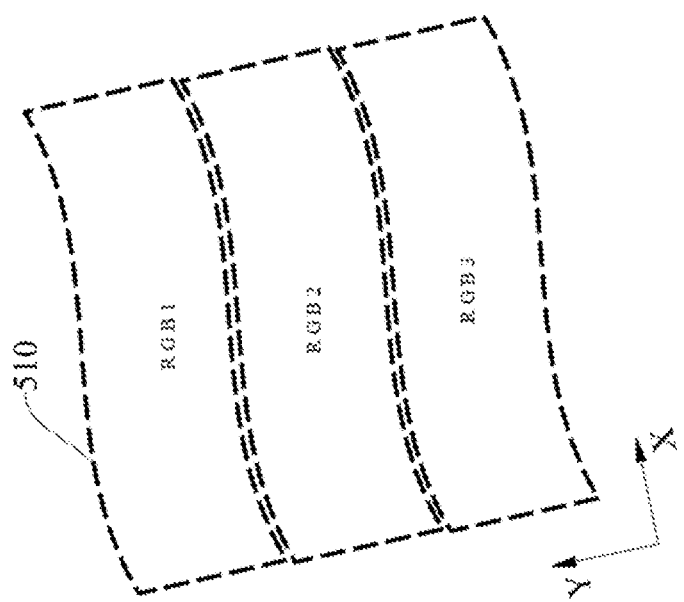
FIG. 10 is a ninth enlarged schematic view of an area A in FIG. 1.
Figure 10:
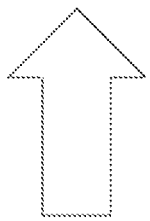
Figure 10:
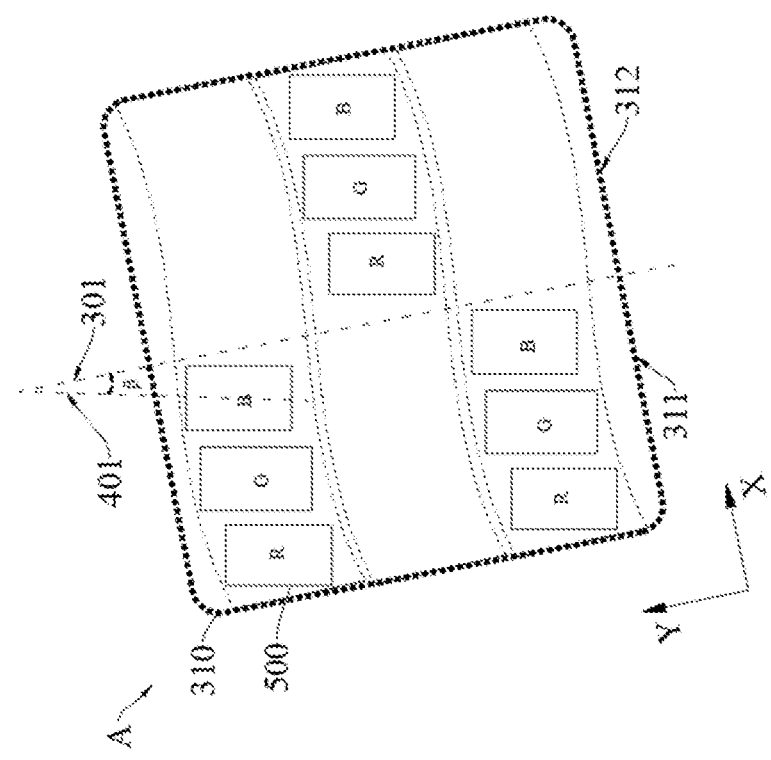
Figure 11:
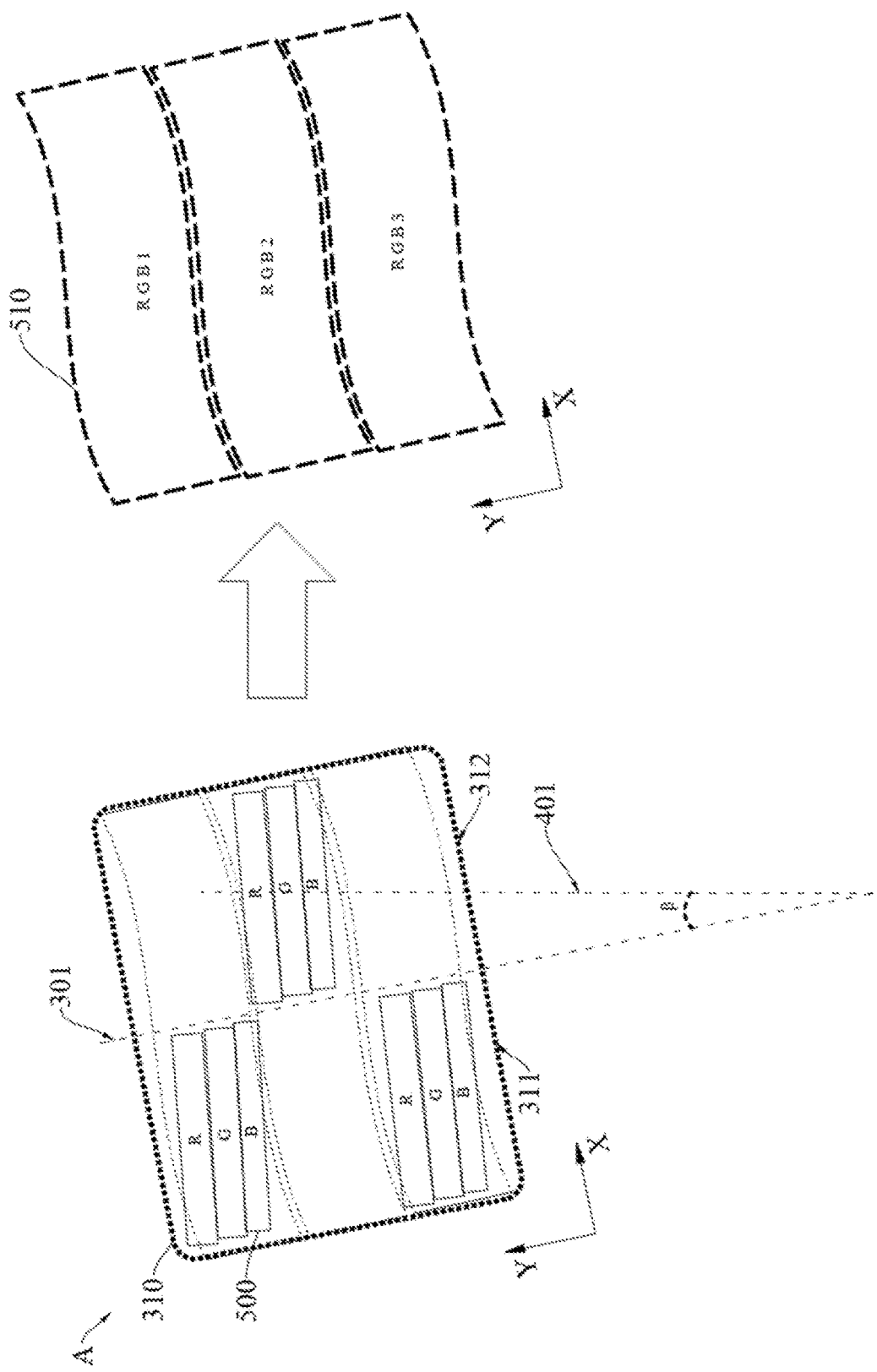
FIG. 11 is a tenth enlarged schematic view of an area A in FIG. 1.

Compared with the structures in the above-mentioned figures, structures in FIG. 9, FIG. 10, and FIG. 11 mainly differ in that the cylindrical lens is rotated, so that the arrangement direction of the subpixels in the first subgroup is no longer the first direction or the second direction, and the arrangement direction of the subpixels in the subgroup becomes a third direction; and the arrangement direction of the subpixels in the second subgroup is no longer the first direction or the second direction, and the arrangement direction of the subpixels in the second subgroup changes to the third direction. The structures illustrated in FIG. 9, FIG. 10, and FIG. 11 are three specific embodiments of rotating the cylindrical lens, which are only examples here, without specific limitations such as shape and arrangement.

In some embodiments, referring to FIG. 9, FIG. 10, FIG. 11, in the top view direction of the display module, the subpixels 500 in the same first subgroup 410 are arranged along the third direction 610, and the subpixels 500 in the same second subgroup 420 are arranged along the third direction 610. An angle between the third direction and the first direction is greater than 0° and less than 90°, and an angle between the third direction and the second direction is greater than 0° and less than 90°. The angle between the third direction 610 and the first direction is denoted by "α". In FIG. 8, the α can be represented by an angle between the third direction 610 and the first virtual centerline 301. In FIG. 8 and FIG. 9, for the convenience of drawing, "RGB1", "RGB2", and "RGB3" are used to represent the fused main pixels.

The extending direction (the first direction) of the cylindrical lens and the arrangement direction (the third direction) of the subpixels are designed to be non-parallel and cross, which is beneficial to relieve moire.

In some embodiments, referring to FIG. 9, FIG. 10, FIG. 11, each subpixel 500 of the visual pixel group 400 has a second virtual centerline 401 non-parallel to the first virtual centerline 301.

An included angle between the second virtual centerline 401 and the first virtual centerline 301 is denoted by "β", that is a rotation angle of the cylindrical lens 310. The second virtual centerline 401 may be a symmetry axis of the corresponding subpixel 500 in its extending direction. By designing the first virtual centerline 301 of the cylindrical lens 310 and the second virtual centerline 401 of each subpixel 500 to be non-parallel and cross, it is beneficial to relieve moire.

In some embodiments, referring to FIG. 9, FIG. 10, FIG. 11, the cylindrical lens 310 can be tilted and rotated, so that each of the subpixels 500 of the visual pixel group 400 has the second virtual centerline 401, and the second virtual centerline 401 is not parallel to the first virtual centerline 301. The included angle between the second virtual centerline 401 and the first virtual centerline 301 ranges from 0° to 45°, that is, the rotation angle β of the cylindrical lens 310 may range from 0° to 45°.

Figure 12:
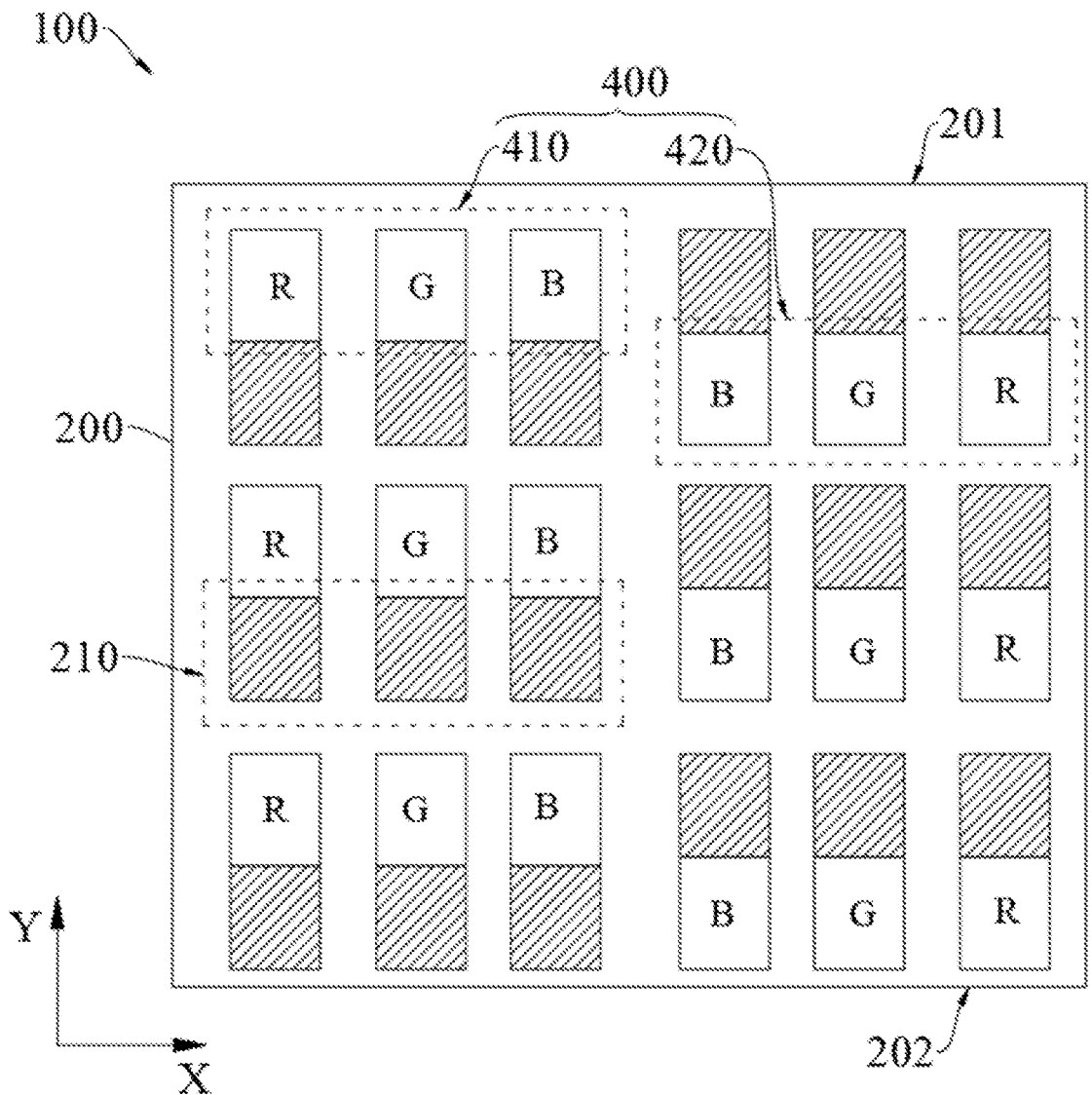
FIG. 12 is a schematic partial top view of a first structure of a display module according to an embodiment of the present disclosure.
Figure 13:
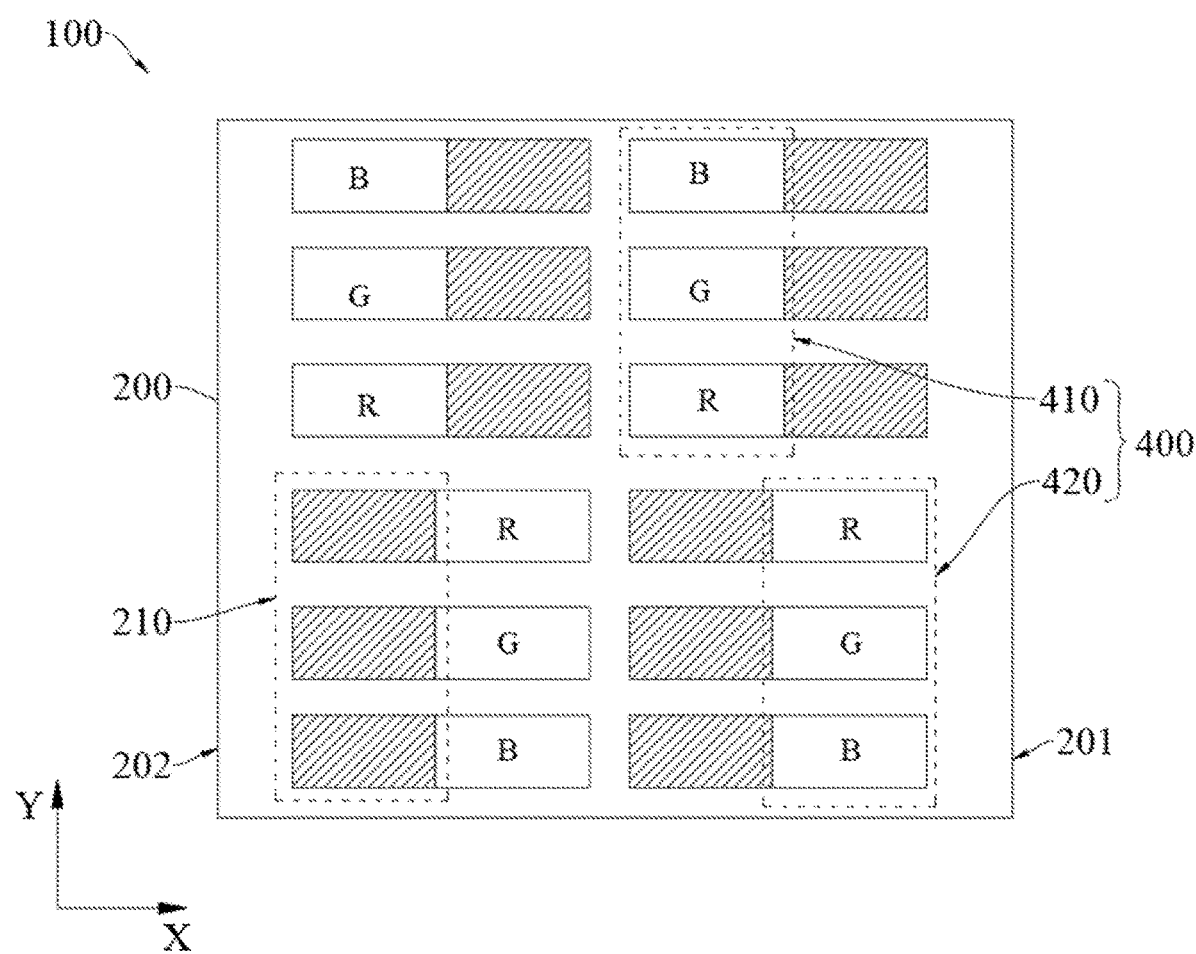
FIG. 13 is a schematic partial top view of a second structure of a display module according to an embodiment of the present disclosure.
Figure 14:
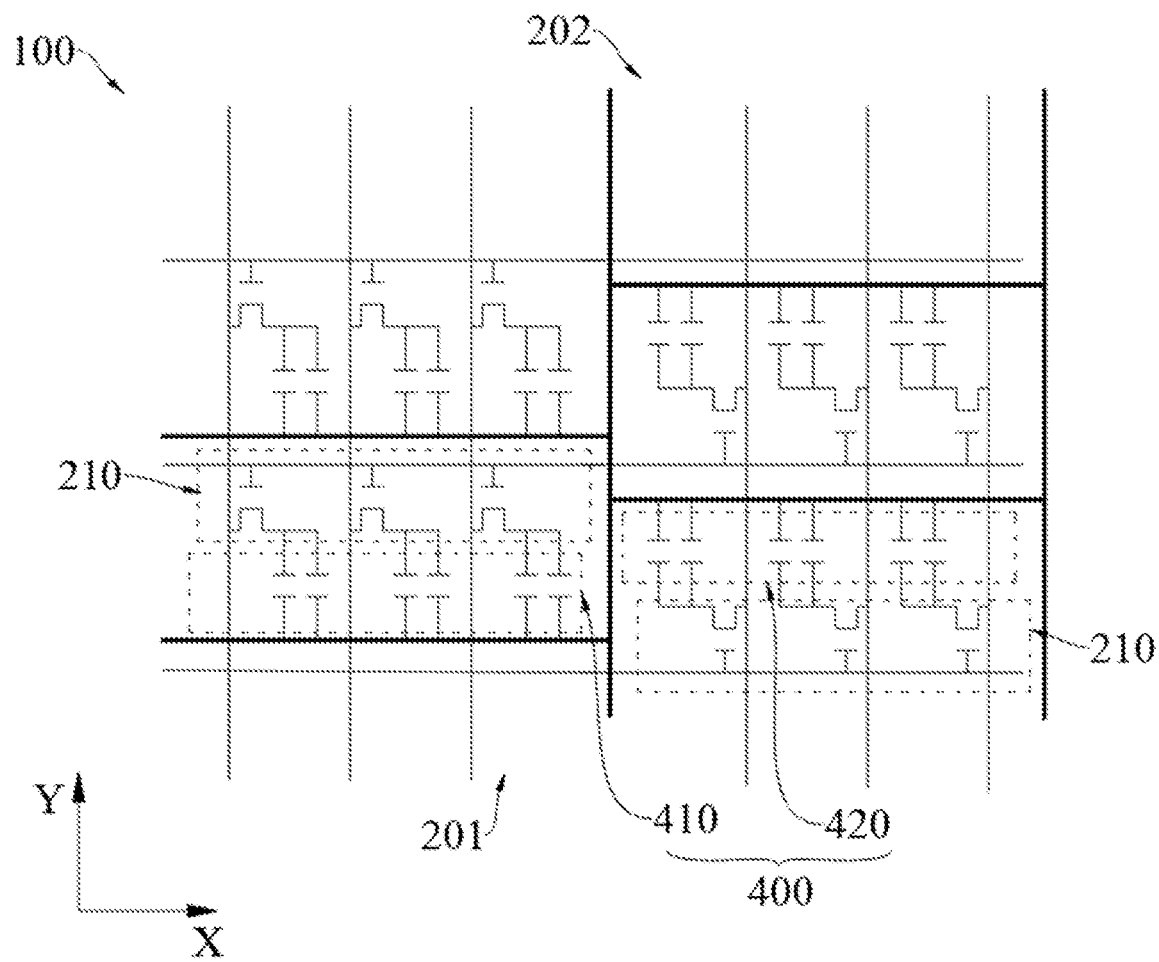
FIG. 14 is a schematic diagram of a partial circuit of a display module according to an embodiment of the present disclosure.

In some embodiments, referring to FIG. 12, FIG. 13, FIG. 14, the display panel 200 further includes a liquid crystal layer and a plurality of driver elements 210. The driver elements 210 are connected to the subpixels 500 of the visual pixel groups 400. In the top view direction of the display module, corresponding to the same visual pixel group 400, the driver element 210 connected to the first subgroup 410 is arranged at a first end 201 of the first subgroup 410 adjacent to the display panel 200, and the driver element 210 connected to the second subgroup 420 is arranged at a second end 202 of the second subgroup 420 adjacent to the display panel 200. The first end 201 and the second end 202 are opposite ends.

The liquid crystal layer is easy to understand and not shown in the figures. As illustrated in FIG. 14, thick solid lines parallel to the Y-axis direction can be scanning lines, and thick solid lines parallel to the X-axis direction can be common electrode lines. Since the driver element 210 connected to the first subgroup 410 is arranged at the first end 201 of the first subgroup 410 adjacent to the display panel 200, and the driver element 210 connected to the second subgroup 420 is arranged at the second end 202 of the second subgroup 420 adjacent to the display panel 200, so that the first subgroup 410 and the second subgroup 420 corresponding to the same cylindrical lens 310 are not completely overlapped in the second direction, thereby maintaining the original resolution of the subpixel 500. After the human eyes receive the information, the resolution can be restored through visual fusion. Therefore, it can reduce the loss of display resolution while realizing naked-eye 3D, and it can also reduce the loss of display resolution when displaying images, thereby improving the perception effect.

In some embodiments, referring to FIG. 12 and FIG. 13, colors of the light emitted by the subpixels 500 in the first subgroup 410 are rotationally symmetrical to colors of the light emitted by the subpixels 500 in the corresponding second subgroup 42. Preferably, it may be symmetrical about the center. For example, the three subpixels 500 in the first subgroup 410 and the three subpixels 500 in the second subgroup 420 are both arranged along the first direction, the three subpixels 500 in the first subgroup 410 are arranged as B, G, R from top to bottom, and the three subpixels 500 in the second subgroup 420 are arranged as R, G, B from top to bottom. Thus, arrangement orders of the R\ G\B subpixels 500 received by the left and right eyes are different, which can improve a mixing effect of visual colors and relieve a problem of color cast.

For example, the three subpixels 500 in the first subgroup 410 and the three subpixels 500 in the second subgroup 420 are both arranged along the second direction, the three subpixels 500 in the first subgroup 410 are R, G, B from left to right, and the three subpixels 500 in the second subgroup 420 are B, G, R from left to right. Thus, after the first subgroup 410 and the second subgroup 420 projected by the cylindrical lens 310, colors of the subpixels 500 arranged at the edge are not same, which can relieve the problem of colored edge, improve the mixing effect of the visual colors, and relieve a problem of color cast.

In some embodiments, the driver element 210 includes a plurality of driver subunits, and each driver subunit is correspondingly connected to one subpixel 500.

In some embodiments, the display panel 200 further includes an array substrate, and the array substrate includes the driver elements 210.

In some embodiments, the array substrate includes a base, an active layer on the base, a first insulation layer on the active layer, a gate layer on the first insulation layer, a second insulation layer on the gate layer, a source-drain layer on the second insulation layer, and a third insulation layer on the source-drain layer.

In some embodiments, the display panel 200 may be a liquid crystal display panel 200. The display panel 200 further includes the liquid crystal layer, a color filter layer, and upper and lower polarization layers. the display module 100 further includes a backlight unit corresponding to the display panel 200.

In some embodiments, the display panel 200 includes the array substrate and light-emitting devices located on the array substrate. The light-emitting device may include organic light-emitting diode (OLED) material, or may include Micro LED Or Mini LED, which is not specifically limited here.

For a self-luminous display panel, there is no problem of light transmission through openings, so a driving circuit can be arranged more freely, and it is easier to be applied in the present disclosure.

In some embodiments, the display panel 200 includes the array substrate and a light-emitting device layer on the array substrate. The light-emitting device layer includes an anode layer on the third insulation layer, a luminescent material layer on the anode layer, and a cathode layer on the luminescent material layer. The display panel 200 further includes a pixel definition layer provided on the same layer as the luminescent material layer, a polarization layer located on the luminescent device layer, and a flexible cover located on the polarization layer. The display panel 200 further includes an adhesive layer correspondingly between the polarization layer and the flexible cover.

In present disclosure, the first subgroup and the second subgroup corresponding to the left and right viewpoints are arranged to not completely overlap in a direction perpendicular to the first virtual centerline of the cylindrical lens, so that subpixels in the first subgroup and the second subgroup will not completely overlap after projected by the cylindrical lens, so as to maintain the original resolution of the subpixels. After the human eyes receive the information, the resolution can be restored through visual fusion. Therefore, it can reduce the loss of display resolution while realizing naked-eye 3D, and it can also reduce the loss of display resolution when displaying planar images, thereby improving the perception effect.

Figure 15:
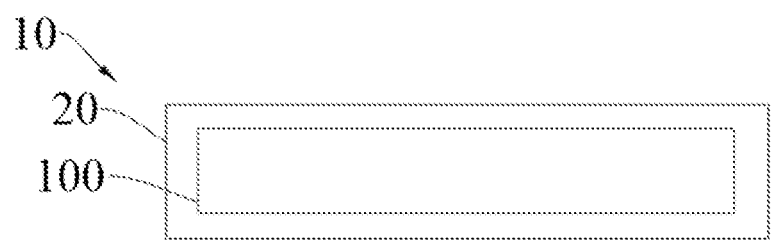
FIG. 15 is a structural schematic view of a display device according to an embodiment of the present disclosure.

Referring to FIG. 15, display devices 10 are provided according to embodiments of the present disclosure. The display device 10 includes any one of the above-mentioned display modules 100 and a device body 20. The device body 20 is combined with the display module 100 as one.

A specific structure of the display module 100 can be referred to any one of the above-mentioned embodiments and drawings of the display modules 100, which will not be repeated here.

In the embodiment, the device body 20 may include a middle frame, frame glue, etc., and the display device 10 may be a display terminal such as a mobile phone, a tablet, a TV, or a giant screen, which is not limited here.

The display modules and the display devices are provided according to embodiments of the present disclosure. The display module includes a display panel and a lens layer. The display panel includes a plurality of visual pixel groups. The lens layer includes a plurality of cylindrical lenses each extending along a first direction. The cylindrical lens has a first virtual centerline which divides the cylindrical lens into a first area and a second area. The visual pixel group includes at least one first subgroup and at least one second subgroup. In present disclosure, the first subgroup and the second subgroup corresponding to the left and right viewpoints are arranged to not completely overlap in a direction perpendicular to the first virtual centerline of the cylindrical lens, so that subpixels in the first subgroup and the second subgroup will not completely overlap after projected by the cylindrical lens, so as to maintain the original resolution of the subpixels. After the human eyes receive the information, the resolution can be restored through visual fusion. Therefore, it can reduce the loss of display resolution while realizing naked-eye 3D, and it can also reduce the loss of display resolution when displaying planar images, thereby improving the perception effect.

The display modules and the display devices according to embodiments of the present disclosure have been described above in detail. In this paper, specific examples are used to illustrate the principle and implementation of the invention. The description of the above embodiments is only used to help understand the method of the present disclosure and its core idea. Those skilled in the art can make various changes and modifications without departing from the spirit of the present disclosure. Therefore, the described embodiments are not intended to limit the present disclosure.

What is claimed is:
1. A display module, comprising:
  a display panel comprising a plurality of visual pixel groups; and
  a lens layer, disposed on a light-emitting side of the display panel and comprising a plurality of cylindrical lenses each covering one of the visual pixel groups,
  wherein each of the cylindrical lenses extends along a first direction and has a first virtual centerline parallel to the first direction, and the first virtual centerline divides a corresponding one of the cylindrical lenses into a first area and a second area;
  each of the visual pixel groups comprises at least one first subgroup corresponding to the first area and at least one second subgroup corresponding to the second area; and in a top view direction of the display module, the first subgroup and the second subgroup are partially overlapped or not overlapped in a second direction perpendicular to the first direction.

2. The display module according to claim 1, wherein each of the first subgroup and the second subgroup comprises at least three subpixels emitting light with different colors.

3. The display module according to claim 2, wherein in the top view direction of the display module, the subpixels in the first subgroup are arranged along the second direction, and the subpixels in the second subgroup are arranged along the second direction.

4. The display module according to claim 2, wherein in the top view direction of the display module, the subpixels in the first subgroup are arranged along the first direction, and the subpixels in the second subgroup are arranged along the first direction.

5. The display module according to claim 4, wherein in the top view direction of the display module, the subpixels in the first subgroup are arranged adjacent along the first direction, and the subpixels in the second subgroup are arranged adjacent along the first direction; and
a ratio of a length of each of the subpixels in the first subgroup and the second subgroup in the first direction to a width of a corresponding one of the cylindrical lenses in the second direction is 1/3.

6. The display module according to claim 2, wherein in the top view direction of the display module, the subpixels in the first subgroup are arranged along a third direction, and the subpixels in the second subgroup are arranged along the third direction; and
an angle between the third direction and the first direction is greater than 0° and less than 90°, and an angle between the third direction and the second direction is greater than 0° and less than 90°.

7. The display module according to claim 2, wherein in the top view direction of the display module, the subpixels in the first subgroup are not overlapped in the second direction, and the subpixels in the second subgroup are not overlapped in the second direction.

8. The display module according to claim 2, wherein each of the visual pixel groups is arranged on a focal plane of a corresponding one of the cylindrical lenses;
a length of the first subgroup in the first direction is equal to a width of the corresponding one of the cylindrical lenses in the second direction; and
a length of the second subgroup in the first direction is equal to the width of the corresponding one of the cylindrical lenses in the second direction.

9. The display module according to claim 2, wherein each of the subpixels of the visual pixel groups has a second virtual centerline non-parallel to the first virtual centerline.

10. The display module according to claim 1, wherein the display panel further comprises a liquid crystal layer and a plurality of driver elements connected to subpixels of the visual pixel groups; and
wherein in the top view direction of the display module, corresponding to a same one of the visual pixel groups, the driver elements connected to the first subgroup is arranged at a first end of the first subgroup adjacent to the display panel, the driver elements connected to the second subgroup is arranged at a second end of the second subgroup adjacent to the display panel, and the first end and the second end are opposite ends.

11. A display device, comprising a display module and a device body, wherein the device body and the display module are combined as one, and the display module comprises:
a display panel comprising a plurality of visual pixel groups; and
a lens layer, disposed on a light-emitting side of the display panel and comprising a plurality of cylindrical lenses each covering one of the visual pixel groups,
wherein each of the cylindrical lenses extends along a first direction and has a first virtual centerline parallel to the first direction, and the first virtual centerline divides a corresponding one of the cylindrical lenses into a first area and a second area;
each of the visual pixel groups comprises at least one first subgroup corresponding to the first area and at least one second subgroup corresponding to the second area; and
in a top view direction of the display module, the first subgroup and the second subgroup are partially overlapped or not overlapped in a second direction perpendicular to the first direction.

12. The display device according to claim 11, wherein each of the first subgroup and the second subgroup comprises at least three subpixels those emit light with different colors.

13. The display device according to claim 12, wherein in the top view direction of the display module, the subpixels in the first subgroup are arranged along the second direction, and the subpixels in the second subgroup are arranged along the second direction.

14. The display device according to claim 12, wherein in the top view direction of the display module, the subpixels in the first subgroup are arranged along the first direction, and the subpixels in the second subgroup are arranged along the first direction.

15. The display device according to claim 14, wherein in the top view direction of the display module, the subpixels in the first subgroup are arranged adjacent along the first direction, and the subpixels in the second subgroup are arranged adjacent along the first direction; and
a ratio of a length of each of the subpixels in the first subgroup and the second subgroup in the first direction to a width of a corresponding one of the cylindrical lenses in the second direction is 1/3.

16. The display device according to claim 12, wherein in the top view direction of the display module, the subpixels in the first subgroup are arranged along a third direction, and the subpixels in the second subgroup are arranged along the third direction; and
an angle between the third direction and the first direction is greater than 0° and less than 90°, and an angle between the third direction and the second direction is greater than 0° and less than 90°.

17. The display device according to claim 12, wherein in the top view direction of the display module, the subpixels in the first subgroup are not overlapped in the second direction, and the subpixels in the second subgroup are not overlapped in the second direction.

18. The display device according to claim 12, wherein each of the visual pixel groups is arranged on a focal plane of a corresponding one of the cylindrical lenses;
a length of the first subgroup in the first direction is equal to a width of the corresponding one of the cylindrical lenses in the second direction; and
a length of the second subgroup in the first direction is equal to the width of the corresponding one of the cylindrical lenses in the second direction.

19. The display device according to claim 12, wherein each of the subpixels of the visual pixel groups has a second virtual centerline non-parallel to the first virtual centerline.

20. The display device according to claim 11, wherein the display panel further comprises a liquid crystal layer and a plurality of driver elements connected to subpixels of the visual pixel groups; and wherein in the top view direction of the display module, corresponding to a same one of the visual pixel groups, the driver elements connected to the first subgroup is arranged at a first end of the first subgroup adjacent to the display panel, the driver elements connected to the second subgroup is arranged at a second end of the second subgroup adjacent to the display panel, and the first end and the second end are opposite ends.

* * * * *